US 8,862,289 B2

(12) United States Patent
Fossion et al.

(10) Patent No.: US 8,862,289 B2
(45) Date of Patent: Oct. 14, 2014

(54) POWER ELECTRONIC CONTROL CIRCUITRY DEVICE

(75) Inventors: Marc Fossion, Ligny (BE); Marc Durvaux, Montigny-le-Tilleul (BE)

(73) Assignee: Thales, Neuilly sur Seine (FR)

( * ) Notice: Subject to any disclaimer, the term of this patent is extended or adjusted under 35 U.S.C. 154(b) by 598 days.

(21) Appl. No.: 13/192,408

(22) Filed: Jul. 27, 2011

(65) Prior Publication Data

US 2012/0197447 A1    Aug. 2, 2012

(30) Foreign Application Priority Data

Jul. 28, 2010    (EP) ..................................... 10171077

(51) Int. Cl.
*G05D 1/00*    (2006.01)
*G05D 1/06*    (2006.01)
*G05D 3/00*    (2006.01)
*G06F 7/00*    (2006.01)
*G06F 17/00*    (2006.01)
*G06F 11/36*    (2006.01)
*G05B 19/042*    (2006.01)
*G05B 11/01*    (2006.01)

(52) U.S. Cl.
CPC ........ *G06F 11/3648* (2013.01); *G05B 19/0428* (2013.01)
USPC ............ 701/10; 701/1; 701/8; 701/9; 700/19; 700/21; 700/79

(58) Field of Classification Search
CPC .......................... G05B 19/0428; G06F 11/3648
USPC ............ 700/19–21, 79, 286, 296–298; 701/1, 701/8–10, 13–18
See application file for complete search history.

(56) References Cited

U.S. PATENT DOCUMENTS

| | | | | |
|---|---|---|---|---|
| 4,535,409 A | * | 8/1985 | Jindrick et al. | ............... 700/293 |
| 6,625,750 B1 | * | 9/2003 | Duso et al. | ....................... 714/11 |
| 7,949,025 B2 | * | 5/2011 | Olea | ........................... 372/38.02 |
| 8,081,191 B2 | * | 12/2011 | Saleem et al. | ................. 345/505 |
| 2003/0085621 A1 | * | 5/2003 | Potega | ............................ 307/18 |
| 2005/0187677 A1 | * | 8/2005 | Walker | ........................... 701/16 |

FOREIGN PATENT DOCUMENTS

| | | | | |
|---|---|---|---|---|
| EP | 2 009 526 A2 | 12/2008 | | |
| EP | 2418552 A1 | * | 2/2012 | .......... G05B 19/042 |
| GB | 2 195 038 A | 3/1988 | | |
| WO | 2007/109894 A1 | 10/2007 | | |

OTHER PUBLICATIONS

Richard Berger et al., "The RAD6000MC System-on-Chip Microcontroller for Spacecraft Avionics and Instrument Control", IEEE Aerospace Conference, Mar. 1, 2008, pp. 1-14, IEEE, Piscataway, NJ, XP031256331.

* cited by examiner

*Primary Examiner* — Ramesh Patel
(74) *Attorney, Agent, or Firm* — Baker & Hostetler LLP

(57) ABSTRACT

A power electronic control circuitry device comprises the following intercommunicating distinct hardware physical entities: a digital microcontroller unit (UNMC) for managing the operation of the device, hardened to withstand the effects of radiations in space; a digital fast regulation unit (UNRR) for controlling priority and real-time processes, hardened to withstand the effects of radiations in space; a digital communication unit (UNC) for communications external to the device, hardened to withstand the effects of radiations in space; a digital tracing and debugging unit (UNTD) for detecting errors in the design of the device; and a digital non-volatile memory (MRN) for storing information representative of the initial configuration of the device, hardened to withstand the effects of radiations in space.

7 Claims, 2 Drawing Sheets

POWER ELECTRONIC CONTROL CIRCUITRY DEVICE

CROSS-REFERENCE TO RELATED APPLICATION

This application claims priority to foreign European patent application No. EP 10171077.0, filed on Jul. 28, 2010, the disclosure of which is incorporated by reference in its entirety.

FIELD OF THE INVENTION

The invention relates to a power electronic control circuitry device.

BACKGROUND

There are many power electronic control circuits, but very few that are suited notably to an aerospace system such as a satellite. In practice, such power electronic control circuits are manufactured in very small series, and are highly customized or dedicated to a particular use.

Furthermore, these control circuits must satisfy very high reliability requirements in highly stressed environments.

Power electronic control circuits are currently known that are produced from discrete analogue components or components with a low level of integration, such as operational amplifiers, comparators or logic flip-flops. Such circuits have to be extensively modified on each change in the customers' requirements, and the discrete peripheral components (resistors & capacitors) have to be adjusted for each equipment item during its production.

Given the variety of the components needed and the procurement lead times for components of sufficient quality to comply with aerospace standards, these existing devices generate large stocks with a low turnover.

Furthermore, the associated labour cost is very high and represents a significant proportion of the final product overall design & manufacturing costs.

SUMMARY OF THE INVENTION

One aim of the invention is to propose a power electronic control circuitry device, of cheaper design, that can be embedded on board an aerospace system.

Therefore, there is proposed, according to one aspect of the invention, a power electronic control circuitry device comprising the following intercommunicating distinct hardware physical entities:
  a digital microcontroller unit for managing the operation of the device, hardened to withstand the effects of radiations in space;
  a digital fast regulation unit for controlling priority and real-time processes, hardened to withstand the effects of radiations in space;
  a digital communication unit for communications external to the device, hardened to withstand the effects of radiations in space;
  a digital tracing and debugging unit for detecting errors in the design of the device; and
  a digital non-volatile memory for storing information representative of the initial configuration of the device, resistant to radiations.

Such a device, produced with a non-volatile or non-volatile memory, and incorporating distinct radiation-resistant logic entities, is particularly well suited to the aerospace domain, such as aviation, launchers/missiles or space, even to robotics in environments subject to radiations. Furthermore, the production cost is limited and the adaptability is greatly enhanced. Furthermore, it is easy to prove the reliability of such a device, which is necessary for the space domain and, more generally, for the aerospace domain. In addition, such a device consumes a limited quantity of energy.

Such a device is particularly well suited to the management of electrical energy and to mecatronics, which does not preclude the use for applications not linked to electrical power management such as the production of smart sensors or other conventional microcontroller applications.

Furthermore, the physical separation of these entities enables each of them to operate in normal or degraded mode, even in case of failure of a neighbouring entity.

In one embodiment, said distinct hardware physical entities also comprise an analogue protection unit, providing temperature, electrical voltage and electrical current protection, to avoid damage to the device and/or to a linked system, hardened to withstand the effects of radiations in space.

Thus, the application can withstand a single failure by avoiding the propagation of a fault.

In one embodiment, the device also comprises an assembly comprising a shared memory and means for managing access to said shared memory, for managing the communications according to a mailbox-type mechanism, between one hardware physical entity of the device and another hardware physical entity of the device.

The expression "communication according to a mailbox-type mechanism" should be understood to mean an exchange of information between hardware physical entities such that the sending entity writes the data of its message into a shared memory at the instant when its internal process allows it to, and the recipient entity reads the data of the message at another later instant defined solely by its own internal process. The result is an asynchronous communication: the sender does not have to wait for the recipient to be ready to receive the message and the recipient is not interrupted in its work by the management of an arrival of a message.

Thus, the risk of timing conflicts is greatly limited, by an increase in the operating segregation of the hardware physical entities. In practice, the execution of a task currently being executed in one of the hardware physical entities being delayed because of information from outside the entity is thus avoided.

According to one embodiment, the device comprises non-volatile memory registers, a memory register comprising a dedicated correcting code for improving the resistance to the effects of radiations in space.

Thus, the configuring of the equipment can be carried out on the production line (by storing parameters in the memory) without having to replace components after measuring the overall equipment performance (adjustable components cannot be used because they are too sensitive to vibrations).

In one embodiment, said access management means are designed to perform a management of said communications in a static and predefined manner in said non-volatile memory registers.

The expression "predefined static management" should be understood to convey the fact that the memory space reserved for the exchange of data, although dependent on the application, is, for a given application, predefined in the configuration stored in the digital non-volatile memory. This configuration is used by the access management hardware means associated with the shared memory to allow or lock access to the memory.

Thus, the risk of timing conflicts is greatly limited, by an increase in the operating segregation of the hardware physical entities. In practice, an incorrect execution in one of the hardware physical entities cannot transmit information to recipients with which it should never exchange information. The possible communication paths and the associated information bit rates are therefore known in advance, which enables each hardware physical entity to work in an entirely deterministic context. It is therefore possible for the designer to explore all the operating cases and to prove the absence of error in the operating process of each hardware physical entity.

In one embodiment, said digital fast regulation, communication, tracing and debugging units and the analogue protection unit comprise finite state machines.

The implementation in the form of finite state machines provides a guarantee that the device cannot enter into an unpredicted state, and allows for a systematic validation with 100% coverage.

For example, said finite state machines are implemented by sequencers executing linear instructions.

Since a sequencer executes only linear instructions, notably without any programming loops, this drastically limits the risks of software bugs in the device.

According to one embodiment, there is also proposed an aerospace system comprising at least one device as described previously, in which a subset of said units can be made redundant.

The aerospace system can thus remain fully operational despite a partial failure.

BRIEF DESCRIPTION OF THE DRAWINGS

The invention will be better understood on studying a few embodiments, described as nonlimiting examples and illustrated by the appended drawings in which FIGS. 1 and 2 schematically represent a power electronic control circuitry device according to two aspects of the invention.

DETAILED DESCRIPTION

Figure 1:
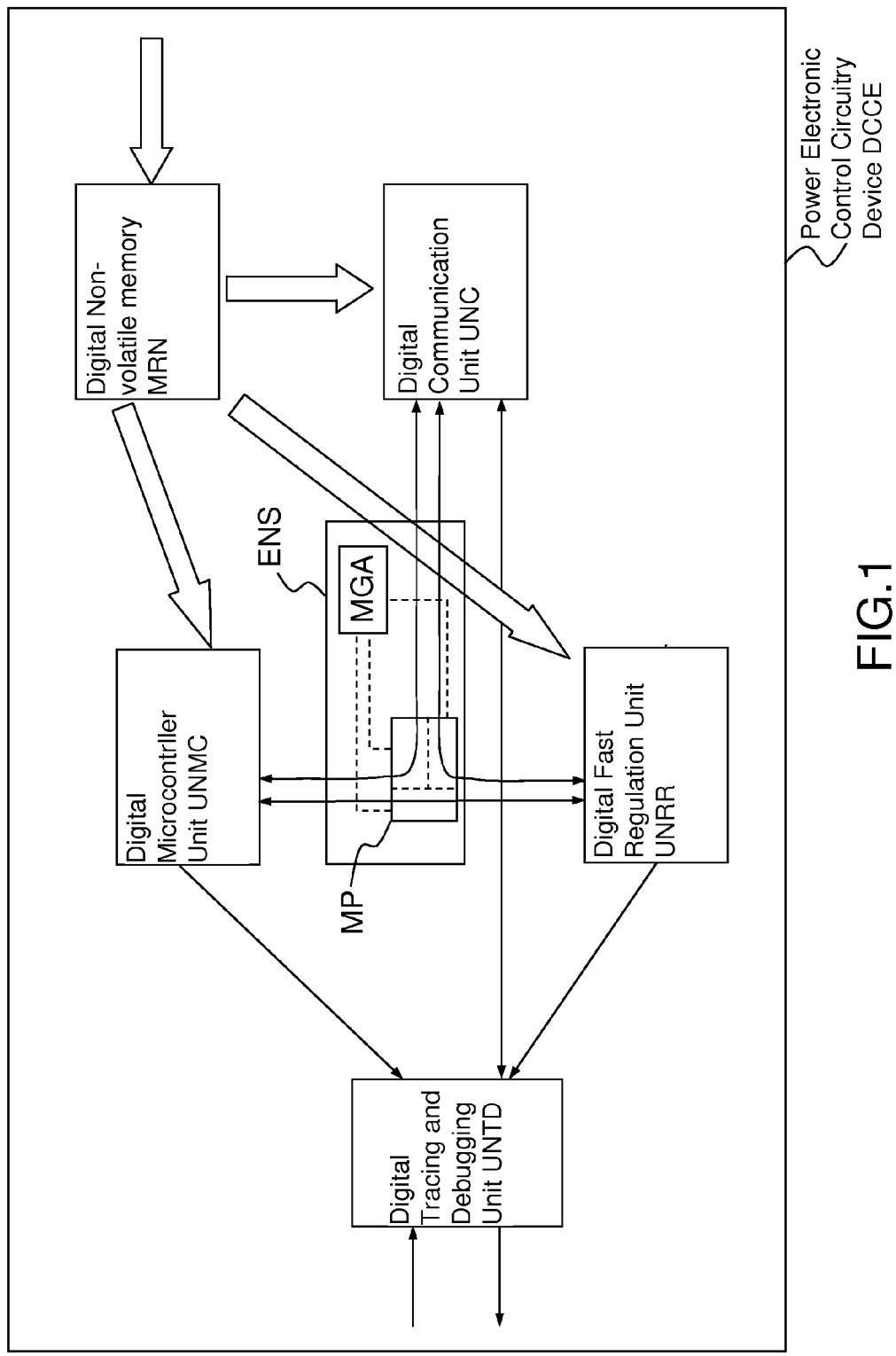

FIG. 1 schematically represents a power electronic control circuitry device (DCCE) according to one aspect of the invention, comprising the following intercommunicating distinct hardware physical entities:
  a digital microcontroller unit UNMC for managing the operation of the device, resistant to radiations;
  a digital fast regulation unit UNRR for controlling priority and real-time processes, resistant to radiations;
  a digital communication unit UNC for communications external to the device, resistant to radiations;
  a digital tracing and debugging unit UNTD for detecting errors in the design of the device; and
  a digital non-volatile memory MRN for storing information representative of the initial configuration of the device, resistant to radiations.

Figure 2:
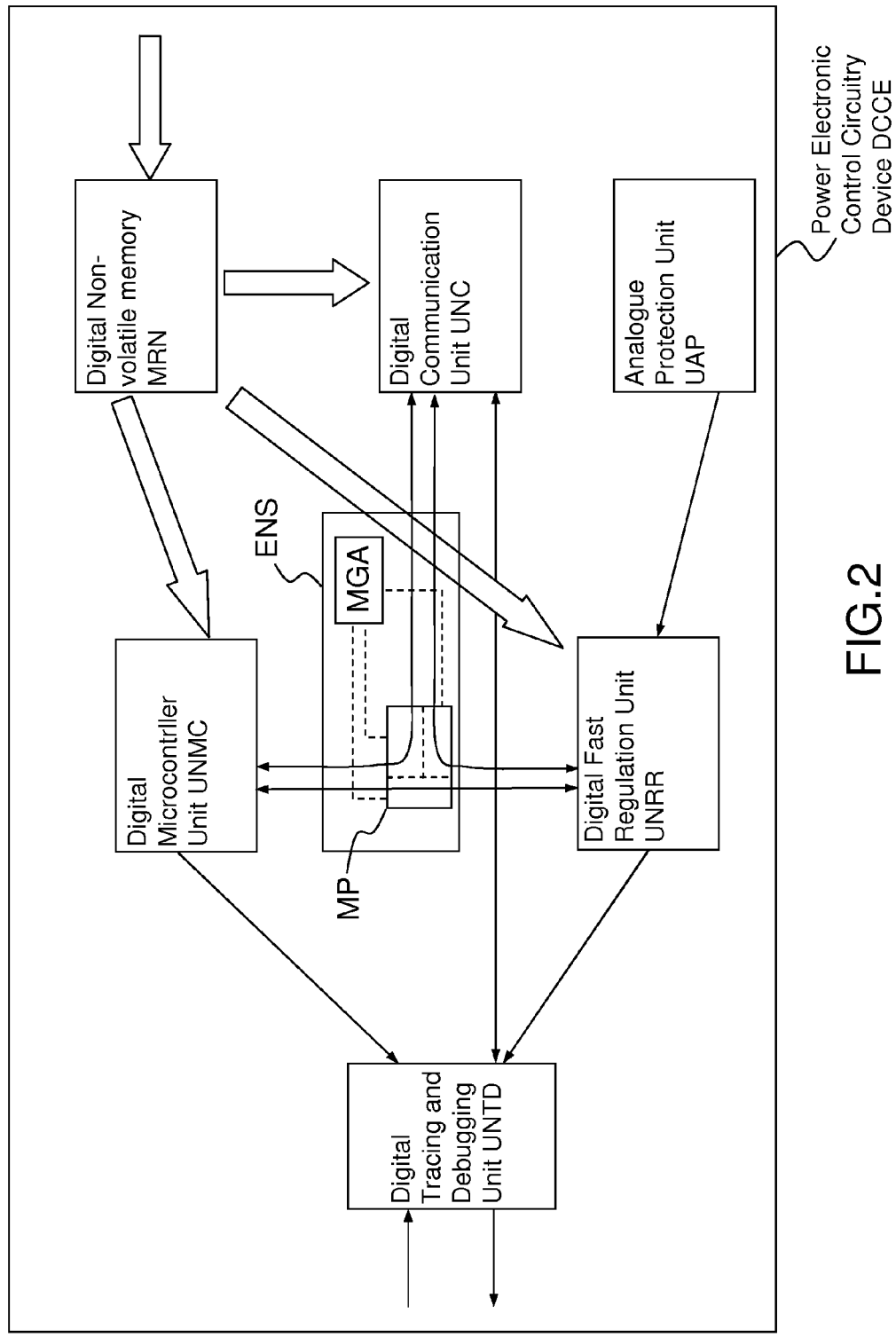

The embodiment of FIG. 2 also comprises an analogue protection unit UAP providing temperature, electrical voltage and electrical current protection, to avoid damage to the device and/or to a linked system, resistant to radiations.

In the present description, the term "tracing" means a tracking of processing in which the progress of a computer program is visualized on a medium, and the term "debugging" means a correction of a computer programming error, or "bug", in a computer program.

The digital microcontroller unit UNMC is devoted to the higher-level control & management of an equipment, and is essentially asynchronous. The digital microcontroller unit UNMC is used notably to manage the operation of the power converters for a system to which the device is linked. The digital microcontroller unit UNMC is used to execute algorithms that are too complex for the fast regulation unit UNRR and which do not require the processing speed offered by the UNRR. It also offers an added dimension of flexibility to address future applications.

By way of examples, the digital microcontroller unit UNMC is particularly suited to handling startup sequences, changes of regulation law parameters (tracking the point of maximum power of a solar panel), or the management of the charging/discharging cycle of a battery.

The digital microcontroller unit UNMC typically consists of a standard microcontroller core whose logic has been hardened to withstand space radiations, and has internal voting and error correction mechanisms.

The digital fast regulation unit UNRR is used notably to manage high priority and extremely fast processes. It is a synchronous unit.

The digital fast regulation unit UNRR comprises a logic that is optimized for digital signal processing in a regulation loop. It is synchronized on the measurements of the analogue quantities present upstream of analogue-digital converters, which serve as inputs to the regulation computation. Its outputs are used to control pulse width modulation logics. The outputs of these logics are directly connected to the amplification circuits which drive the power switching elements.

The digital fast regulation unit UNRR typically consists of registers, and arithmetic and logic units optimized for digital signal processing in integer numbers, the entirety paced by a configurable sequencer. The regulation algorithm is therefore defined by defining a sequence and parameters. It should be noted that this approach makes it possible to manage a simple but rapid change of regulation law based on a condition linked to a measured analogue quantity.

The digital communication unit UNC is used notably to manage the exchanges of data, whether synchronous or asynchronous.

Since the digital communication unit UNC is programmable, it can be adapted to different communication protocols. Since it is also distinct from the digital microcontroller unit UNMC and from the digital fast regulation unit UNRR, the execution of the communication algorithms cannot interfere with the tasks entrusted to the other units.

In terms of implementation, the digital communication unit UNC comprises a data serialization/deserialization logic, a receive clock synchronization logic, a transmit clock generation logic, and a transmission error detection code computation logic. These logic functions are organized around a programmable sequencer, registers and a basic arithmetic and logic unit.

The digital non-volatile memory MRN is used notably, when powering up the digital chip, to recover the configuration data of the device, and distribute said data in the device. The instruction sequences executed by the digital fast regulation unit UNRR, for the formatting of the messages, and for the management of the various units of the device, are all fetched from the digital nonvolatile memory MRN during the initial reset phase.

The digital non-volatile memory MRN contains a table of the interactions that are permitted and prohibited between the various units of the device. Also, if one of the units is not used, the configuration makes it possible to deactivate its operation which results, on the one hand, in a reduced energy consumption, and, on the other hand, in a limiting of the undesirable risk of malfunction of this unit (reduced risk of propagation errors).

The digital non-volatile memory MRN is typically implemented by electrically erasable and programmable memory with redundancy to allow for the correction of storage errors. This memory is associated with an error correction logic which is activated when the memory is read on starting up the device.

The analogue protection unit UAP is implemented on the analogue chip, so a complete loss of the regulation function, situated on the digital chip, does not result in the propagation of errors to the other units of the device. This protection unit UAP notably allows for an electrical voltage protection of the device (to prevent an excess of electrical voltage from being able to be sent to the device or to the system linked to the device), an electrical current protection (to prevent an excess of electrical current from being able to be sent to the device or to the system linked to the device), and a temperature protection (to avoid damage to other equipment from jumps in temperature).

Conventionally, tracing and debugging are used to assist the designer of the device when testing and adjusting the device. The implementation of traces and of debugging is based on interrupts and flags which can be added to the strings of digital instructions so that the designer can read values of the internal state of the device. Such an approach is not possible for aerospace, critical or high-reliability applications. In practice, the observation method obviously influences the system which is observed.

The tracing and debugging implemented in the device are totally transparent to the application. This means that, through an appropriate architecture of the device, the observation of the values of the internal state of the device does not influence the overall behaviour of the device. The variables are only read by the tracing and debugging unit UNTD.

Unlike the known usual tracing and debugging design, the present tracing and debugging unit UNTD is not limited to tracking the internal variables of the device. In practice, it can also, independently of the digital fast regulation unit UNRR, acquire analogue quantities with a specific timebase. This functionality, which is similar to that of an oscilloscope embedded in the equipment, makes it possible, during debugging, to observe the behaviour of the regulation loop in relation to other physical quantities (voltages, currents, temperature, etc.).

The aim is to be able to observe the behaviour of the device or of the system to which it is linked, during the final performance test phases. It is therefore essential for these test phases to be carried out precisely in the state representative of the final use. For these reasons, the tracing and debugging unit UNTD is powered by an external power supply (no use of the source supplying energy to the digital chip itself so that it cannot be said that this consumption of electrical current changes the behaviour of the device).

These functionalities allow for investigations under conditions where access is difficult (sealed equipment and space vacuum: among the tests undergone by space equipment, there is mandatorily a test phase which is executed under conditions reproducing the real environmental conditions. This is done by placing the equipment concerned inside a caisson in which the space vacuum conditions are recreated.)

The tracing and debugging unit UNTD is organized around a programmable sequencer associated with registers and a basic arithmetic and logic unit. It has a buffer memory which is used to store samples acquired at high speed before retransmission via the digital communication unit UNC. Counters are used to generate a local timebase and to synchronize a capture on an occurrence of events. Comparators are used to trigger the capture on a combinatorial condition present at one of its inputs. At the input, it has access to the analogue-digital converters and to the registers of the digital microcontroller unit UNMC and of the digital fast regulation unit UNRR.

Advantageously, the device also comprises an assembly comprising a shared memory and a module for managing access to said shared memory, for managing the communications according to a mailbox-type mechanism between one hardware physical entity of the device and another hardware physical entity of the device.

The access management module is designed to provide static management for said communications.

Read-mode access to an instruction written in the shared memory is reserved for the entity for which it is intended, whereas write-mode access is unlimited for all the entities.

The invention claimed is:

1. A power electronic control circuitry device comprising the following intercommunicating distinct hardware physical entities:
   a digital microcontroller unit for managing the operation of the device, hardened to withstand the effects of radiation in space;
   a digital fast regulation unit, operatively coupled to the digital microcontroller unit, for controlling priority and real-time processes, hardened to withstand the effects of radiation in space;
   a digital communication unit, operatively coupled to the digital microcontroller unit, for communications external to the device, hardened to withstand the effects of radiation in space;
   a digital tracing and debugging unit, operatively coupled to the digital microcontroller unit, the digital fast regulation unit, and the digital communication unit, for detecting errors in the design of the device;
   a digital non-volatile memory, operatively coupled to the digital microcontroller unit, the digital fast regulation unit, and the digital communication unit, for storing information representative of the initial configuration of the device, hardened to withstand the effects of radiation in space; and
   an assembly comprising a shared memory and means for managing access to said shared memory, for managing the communications according to a mailbox-type mechanism between one hardware physical entity of the device and another hardware physical entity including at least one of the digital microcontroller unit, the digital fast regulation unit, the digital non-volatile memory, and the digital communication unit, of the device, ensuring a physical segregation of said entities and a deterministic behaviour.

2. The device according to claim 1, in which said distinct hardware physical entities further comprise an analogue protection unit, providing temperature, electrical voltage and electrical current protection, to avoid damage to the device and/or to a linked system, wherein the analogue protection unit is resistant to radiation.

3. The device according to claim 1, further comprising non-volatile memory registers, a memory register comprising a dedicated correcting code for improving the resistance to the effects of radiation in space.

4. The device according to claim 3, wherein said access management means are designed to perform a management of said communications in a static and predefined manner in said non-volatile memory registers.

5. The device according to claim 1, wherein said digital rapid regulation, communication, tracing and debugging units and the analogue protection unit comprise finite state machines.

6. The device according to claim 5, wherein said finite state machines are implemented by sequencers executing linear instructions.

7. An aerospace system, comprising at least one device according to claim 1, in which a subset of said units can be made redundant.

* * * * *